May 7, 1963　　　C. T. MULFORD　　　3,088,507
CITRUS FRUIT SECTIONIZING HEAD
Filed Feb. 8, 1960　　　2 Sheets-Sheet 1
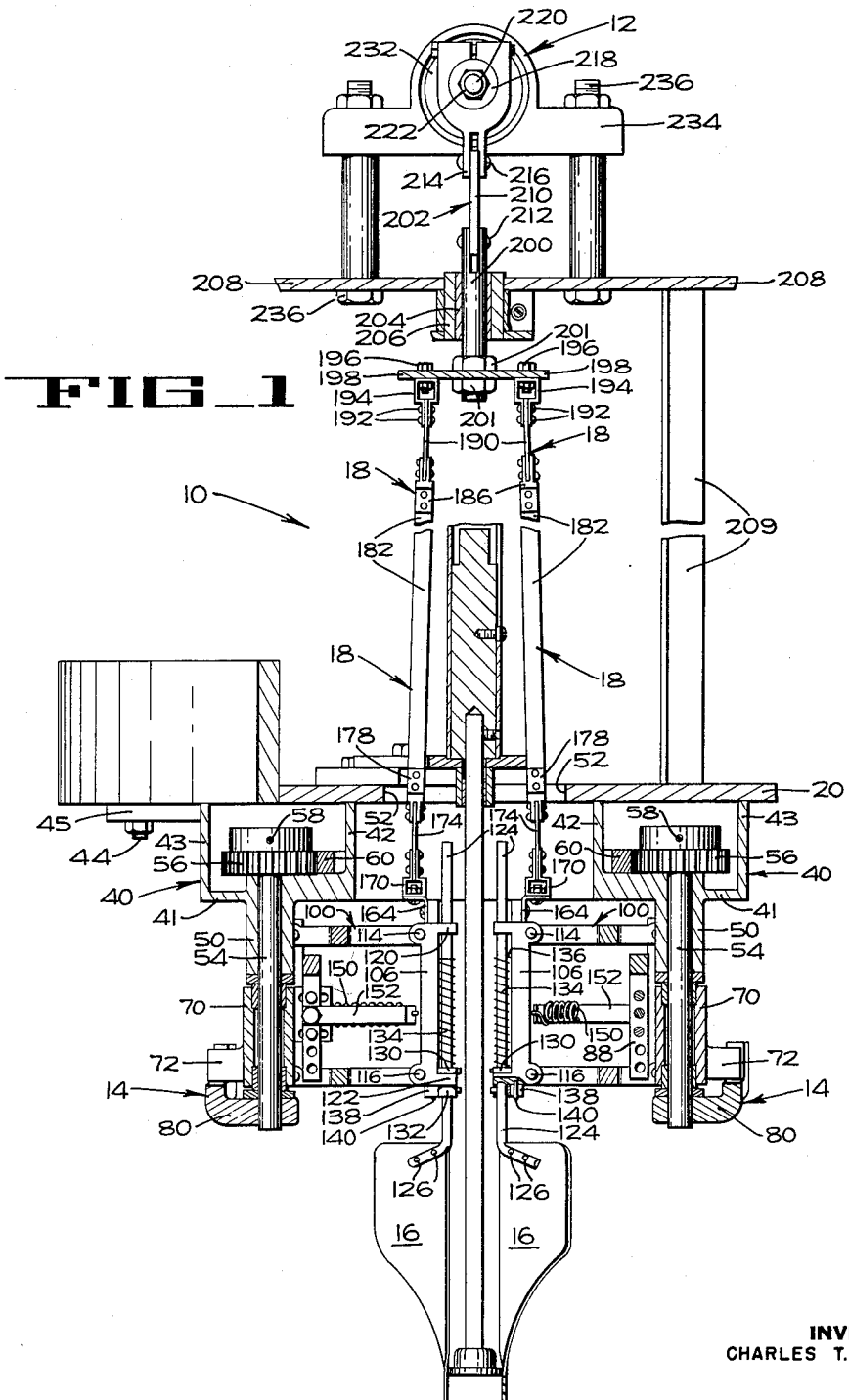
INVENTOR
CHARLES T. MULFORD
BY Hans G. Hoffmeister
ATTORNEY May 7, 1963  C. T. MULFORD  3,088,507
CITRUS FRUIT SECTIONIZING HEAD
Filed Feb. 8, 1960  2 Sheets-Sheet 2
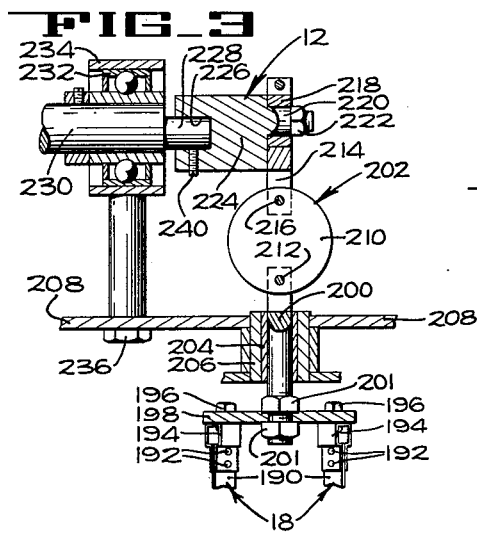
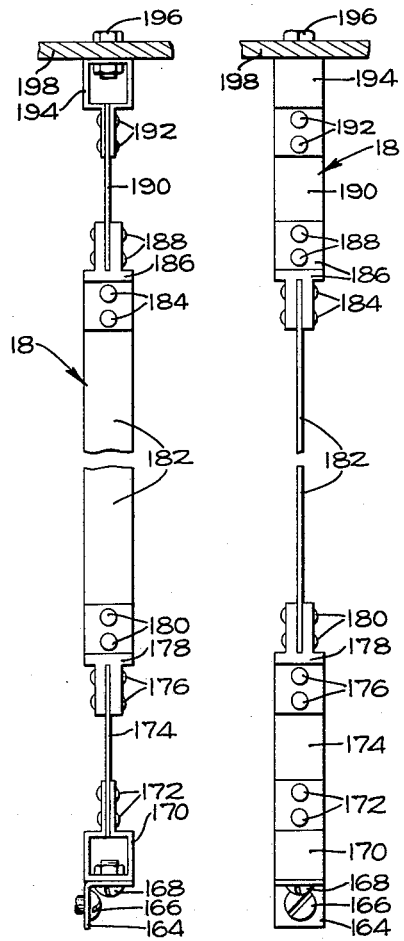
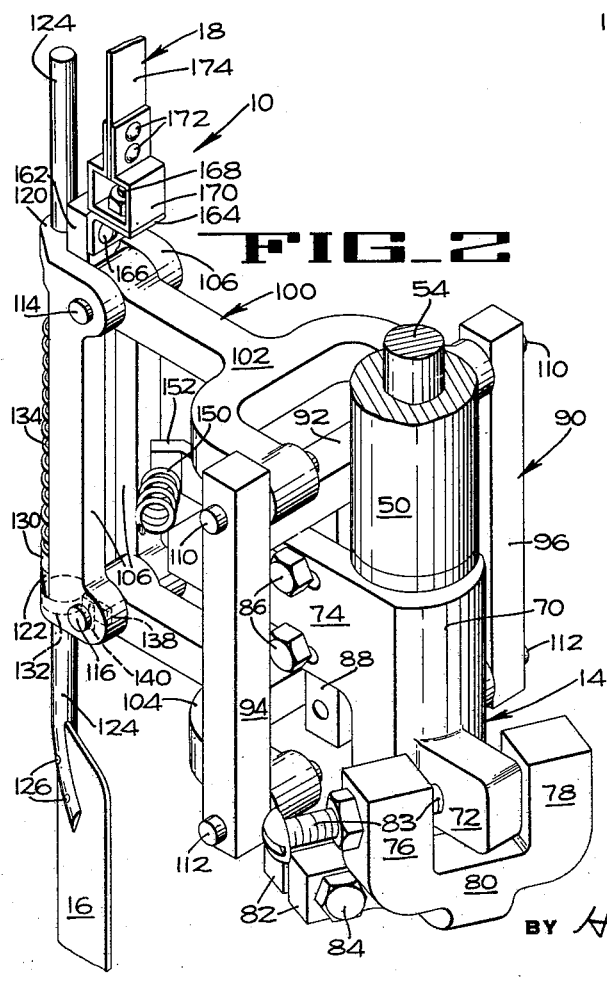
INVENTOR
CHARLES T. MULFORD
BY Hans G. Hoffmeister
ATTORNEY

United States Patent Office

3,088,507
Patented May 7, 1963

3,088,507
CITRUS FRUIT SECTIONIZING HEAD
Charles T. Mulford, Lakeland, Fla., assignor to FMC Corporation, a corporation of Delaware
Filed Feb. 8, 1960, Ser. No. 7,383
3 Claims. (Cl. 146—3)

This invention pertains to apparatus for sectionizing fruit and more particularly relates to an improved actuator for a citrus fruit sectionizing head.

The meat or juice bearing portion of a citrus fruit is composed of groups of interconnected juice sacs, each group being in the form of a segment or section which is surrounded by a membrane. The portions of the segment wall, which extend radially from the axis or core of the whole fruit and define the plane surfaces of the segment, are referred to as the radial membranes, while the portion of the segment wall which lies adjacent the peel of the fruit and defines the spherical face of the segment is referred to as the outer membrane.

In the citrus fruit industry, "sectionizing" is an operation by which the naturally shaped, membrane-free meat segments are removed from the citrus fruit, and this operation is generally performed by first removing the outer skin and albedo, subjecting the fruit to a hot lye treatment to remove the outer membrane from each of the segments, and stripping the individual radial membranes from each of the segments or juice sac groups. The stripping operation is frequently performed manually by the slow and inefficient method of cutting the membranes loose from each meat segment.

Machines previously proposed for sectionizing citrus fruit such as grapefruit have met with limited success due to the fact that the segments in a grapefruit vary in number from 9 to 16 and there are a number of other variable factors. These considerations make it difficult to design and manufacture a machine that will produce well formed membrane free meat segments in their natural size without rupturing a large percentage of the juice sacs in a segment. Rapidly vibrating sectionizing knives have recently been proposed as a way of effecting the separation of a membrane from the segment. Sectionizing machines, which include vibrating knives, have met with success, however the actuators for the vibrating knives have heretofore had several wear points which require periodic maintenance, because the knives are mounted for universal movement within a limited range.

An object of the present invention is to provide an improved citrus fruit sectionizing head.

Another object of the invention is to provide an improved actuator for a vibrating citrus-fruit-sectionizing knife which actuator has no wear points.

Another object of the invention is to provide an actuator for a vibrating tool that is mounted for movement in more than one plane.

These and other objects and advantages of the invention will become apparent from the following description and the accompanying drawings, in which:

FIG. 1 is a fragmentary vertical section of a fruit sectionizing head incorporating the improved actuating mechanism of the present invention.

FIG. 2 is an enlarged isometric of a portion of the head illustrated in FIG. 1.

FIG. 3 is a vertical section of a portion of an eccentric drive mechanism illustrated in FIG. 1.

FIG. 4 is an enlarged front elevation of the actuator linkage for the sectionizing head.

FIG. 5 is an enlarged side elevation of the actuator linkage illustrated in FIG. 4.

The improved processing head or sectionizing head mechanism of the present invention is particularly adapted for use in a citrus fruit sectionizing machine of the type disclosed in copending U.S. application of Wilbur C. Belk et al., Serial No. 823,176, filed June 26, 1959, now Patent No. 3,045,729, and of the type disclosed in the copending U.S. application of H. W. Grotewald, Serial No. 730,335, filed April 23, 1958, both of the foregoing applications being assigned to the assignee of the present invention.

A peeled and treated fruit which is to be sectionized is fed into the sectionizing machine on an input mechanism and after passing a seed disturbing station the fruit is indexed on a main turret under a sectionizing head 10 (FIG. 1). A sectionizing machine would normally require more than one sectionizing head 10 and each of the sectionizing machines referred to in the above cited patent applications, for example, has several sectionizing heads. Each sectionizing head 10 comprises a drive mechanism 12, six blade guiding mechanisms or blade control units 14, six blades 16, one blade being connected to a respective blade guiding unit 14, and includes actuator links 18 for connecting the drive mechanism 12 with each of the blade guiding or control units 14. The blades 16 and the respective blade guiding units 14 are each arranged to be vibrated or reciprocated rapidly in a vertical direction as they engage and move downward into a grapefruit. The downward movement of the vibrating blades causes the blades to enter the grapefruit and separate the meat segments from the radial membranes enclosing them. After the fruit has been operated upon by each of the several sectionizing heads 10, the grapefruit is positioned under a stripper unit that engages the several radial membranes and withdraws them toward the central core of the fruit. This withdrawal of the membranes destroys any bond remaining between the several segments of the fruit and permits the stripped segments to drop onto a discharge mechanism. The membrane free segments are conveyed away by the discharge mechanism and are subsequently processed or canned as desired.

The various members of the machine, including the input and discharge mechanisms, the main turret, the indexing mechanism and the drive mechanisms for the turrets, are substantially identical to those disclosed in the two above mentioned applications and reference may be had to these applications for complete description of the construction and operation of these several mechanisms. The present sectionizing head differs from the sectionizing head disclosed in the Belk application by the provision of an improved wear-free actuator for the sectionizing blades.

When a grapefruit to be sectionized is indexed under the sectioninizing head 10, a tool plate 20 mounting the head 10 and the eccentric drive mechanism 12 descends toward the fruit causing the sectionizing blades 16 to enter the fruit near the central axis thereof. The sectionizing head 10 (FIG. 1) comprises a gear housing 40 which includes a bottom wall 41, an inner cylindrical wall 42 and an outer cylindrical wall 43. The gear housing 40 is secured to the under side of the tool plate 20 by means of suitable bolts 44 that secure outwardly projecting tabs 45 of the gear housing 40 to the tool plate 20. The head 10 includes six blade guide units 14, and accordingly, six sectionizing blades 16. Six tubular bearings 50 (FIG. 1) are integrally formed on the bottom wall 41 of the gear housing 40. The six tubular bearings 50 project downward from the bottom wall 41 and are formed on a common circle in equal-angular spaced relation around the axis of a round opening 52 in the tool plate 20. Each of the tubular bearings 50 rotatably journals a shaft 54. A pinion gear 56 is fastened to the upper end of each shaft 54 by a setscrew 58. Each of the six pinion gears 56 mesh with a ring gear 60 (FIG. 1) that rests on the bottom wall 41 of the gear housing and is arranged to be driven by driving mechanism (not shown). It will be observed that rotary movement of the ring gear 60 will cause rotary movement of each of the pinion gears 56 and its attached gear shaft 54.

One blade control or blade guiding unit 14 (FIGS. 1 and 2) is mounted on the lower end of each pinion gear shaft 54 for the purpose of supporting the associated sectionizing blade 16 for vertical vibratory movement and for the purpose of controlling the swinging of the blade in a horizontal plane. The six blade guiding units 14 are identical and therefore only one will be described in detail. A blade guiding unit 14 (FIG. 2) includes a hub 70 that is freely journalled on the lower end of the associated pinion gear shaft 54. The hub 70 includes oppositely projecting arms 72 and 74. The arm 72 is disposed between two upstanding arms 76 and 718 of a yoke member 80 on which a split collar 82 is integrally formed. A bolt 84 is arranged to clamp the split collar 82 to the shaft 54 so that the hub 70 will rotate on the shaft 54 to the extent permitted by contact of the arm 72 with the upstanding arm 78 and with a stop screw 83 in the arm 76. The split collar 82 is provided so that angular adjustment of the yoke member 80 relative to the pinion gear shaft 54 can be made.

The other arm 74 (FIG. 2) of the hub 70 is secured by bolts 86 to a depending member 88 of a rigid frame 90. The rigid frame 90 includes the depending member 88, a cross bar 92 and a pair of vertical side bars 94 and 96. The various members of the rigid frame 90 are secured together by welding. Attached to the rigid frame 90 is a parallelogram blade carrying mechanism 100 (FIG. 2) which includes an upper yoke 102, a lower yoke 104, and a blade support frame 106. The upper yoke 102 is pivotally mounted to the upper end of the side bars 94 and 96 by pins 110. similarly the lower yoke 104 is pivotally mounted to the lower ends of the side bars 94 and 96 by pivot pins 112. The distal ends of the upper and lower yokes 102 and 104 are pivotally connected to the upper and lower ends, respectively, of the blade support member 106 by pivot pins 114 and 116. The blade support frame 106 includes an upper apertured projection 120 and a lower apertured projection 122, which projections rotatably journal a blade supporting rod 124. The rod 124 is curved and slotted at its lower end to receive a sectionizing blade 16 therein. The sectionizing blade 16 is secured to the rod 124 by means of two rivets 126. Vertical movement of the rod 124 within the apertured projections 120 and 122 is prevented by two positioning collars 130 and 132 which are secured, respectively, to the rod 124 above and below the lower apertured projection 122. The blade supporting rod 124 is urged to rotate in a clockwise direction (FIG. 2) by a torsion spring 134 which is anchored at its upper end 136 in the blade support frame 106 and anchored at its lower end in an axially directed hole in the upper positioning collar 130. The spring 134 moves the rod 124 in a clockwise direction to the extent permitted by an abutment arm 138 (FIGS. 1 and 2), formed integrally on the lower positioning collar 132, abutting against a stop pin 140 that projects downwardly from the lower end of the blade support frame 106.

Each blade control or blade guiding mechanism 14 includes a tension spring 150 (FIGS 1 and 2) that is secured at one end to a projection 152 of the rigid frame 90 and secured at its other end (not shown) to the gear housing 40 (FIG. 1). The spring 150 is so arranged that it urges the parallelogram blade carrying mechanism 100 and its blade 16, in a counterlockwire direction about the axis of the pinion gear shaft 54 (FIG. 2).

It will thus be seen that during the sectionizer operation each blade guiding unit is vibrated in a vertical direction and concurrently swung in two directions in a horizontal plane.

The several blades 16 of the sectionizing head 10 (FIG. 1) are simultaneously vibrated in a vertical direction by the eccentric drive mechanism 12 (FIG. 1). The blade supporting frame 106 of each blade guiding unit 14 is connected to the eccentric drive mechanism 12 by an actuator link 18 (FIGS. 1, 2, 4 and 5). Each actuator link 18 (FIG. 2) is connected to a vertical projection 162 of the associated blade support frame 106 by an angle bracket 164 that is connected to the projection 162 and the lower end of the actuator link 18 by screws 166 and 168, respectively. The screw 168 passes through the angle bracket 164 and is fastened to a rectangular clamp 170 at the lower end of the actuator link. The rectangular clamp 170 is connected by a pair of rivets 172 to a short strip of spring teel 174. The spring steel strip 174 is connected by rivets 176 to a clamp 178. The clamp 178 is connected by a pair of rivets 180 to an intermediate strip of spring steel 182. The intermediate strip of spring steel 182 is connected by a pair of rivets 184 to a second clamp 186 and this clamp is in turn connected by rivets 188 to a short strip of spring steel 190. The spring steel strip 190 is connected by a pair of rivets 192 to a rectangular clamp 194. The rectangular clamp 194 is connected by a capscrew 196 to a reciprocating plate 198 (FIGS. 1, 4 and 5). It will be observed that the strips of spring steel 174 and 190 are oriented in a plane which is at 90° from the plane of the intermediate spring steel strip 182. This manner of interconnecting the three strips provides a universal linkage mechanism which can be flexed into any vertical plane, has no friction points or wear points which could periodically require maintenance, and provides an efficient and inexpensive mechanism for transmitting vibratory movement to a blade guide mechanism that swings in a horizontal plane.

The upper end of each of the actuator linkages 18 is connected to the vibrating or reciprocating plate 198 (FIG. 1) and the plate 198 is connected to the eccentric drive mechanism 12 by a rod 200 having nuts 201 thereon and by a disc link mechanism 202 (FIGS. 1 and 3). The rod 200 is journaled for vertical movement in a bushing 204 disposed in a collar 206 welded to a support plate 208. The support plate 208 is rigidly connected to the tool plate 20 (FIG. 1) by a plurality of supports 209 (one being shown).

The upper end of the rod 200 is slotted to receive a spring steel disc 210 therein. The disc is connected to the rod 200 by a rivet 212 and is connected to a slotted depending arm 214 of the eccentric drive mechanism 12 by a rivet 216. The depending arm 214 includes a bearing 218 which is rotatably journaled on a stub shaft 220. The depending arm 214 is retained on the stub shaft by a nut 222. The stub shaft 220 (FIG. 3) is formed eccentrically on the end of a short shaft 224. The shaft 224 has a cylindrical recess 226 therein that is disposed concentric with the axis of the shaft 224. The recess 226 is adapted to receive an eccentric stub shaft 228 projecting from the end of a drive shaft 230. The drive shaft 230 is journaled in a bearing 232 mounted on a frame bar 234 which is rigidly connected to the support plate 208 by bolts 236. The amount of eccentric movement imparted to the depending arm 214 by the drive shaft 230 can be adjusted by loosening a setscrew 240 which bears against the stub shaft 228 and angularly adjusting the short shaft 224 with respect to the stub shaft 228.

It will be observed that, as the depending arm 214 (FIG. 1) moves the rod 200 up and down, the disc 210 flexes to one side and then the other. The circular movement of the eccentric stub shaft 220 is thus changed into linear reciprocatory movement of the rod 200 without any frictional engagement occuring between the moving parts that accomplish the change. This inexpensive disc link mechanism requires no maintenance and will perform satisfactorily for a very long time.

The blade supporting frame 106 of a blade guiding mechanism 14 is oscillated in the vertical direction by the associated actuator link 18, and the link 18 must continue to oscillate the frame 106 during the swinging of the blade guiding mechanism 14 around the pinion gear shaft 54. The actuator link 18 is well adapted to do this because the orientation of the several steel strips permit the link 18 to flex in any direction and accommodate any movement of the blade guiding mechanism 14 while continuing to vertically reciprocate the sectionizing blade 16 connected thereto.

While a mechanical eccentric drive mechanism has been disclosed, pneumatic, hydraulic and electric mechanisms have been successfully used for imparting vibratory or reciprocatory movement to the blades. It will be understood that modifications and variations may be effected without departing from the scope of the present invention.

The invention having been described that which is claimed as new and which is desired to be protected by Letters Patent is:

1. In a citrus fruit sectionizing machine having apparatus for concurrently reciprocating a plurality of sectionizing blades; the combination of a plurality of guiding units one for each blade, said guiding units each comprising means for holding a sectionizing blade, means adapted to swing the blade about a vertical axis, and means adapted to swing the blade about a horizontal axis; a head plate; a resilient metal disc fastened to said head plate and to said reciprocating apparatus for reciprocating the head plate in a vertical direction; and a universally flexible means connected between said head plate and each of said guiding units, each of said universally flexible means comprising at least two strips of metal fastened together in end-to-end relationship one of said strips being oriented at approximately 90° to the other.

2. In a fruit processing machine, a flexible link for transmitting reciprocating motion to a fruit processing head that is mounted for movement in a direction perpendicular to the axis of reciprocation, said flexible link comprising three strips of resilient material aligned longitudinally in end to end relationship, each strip having a width substantially greater than its thickness, and clamp members interconnecting said strips in oriented relation with the end strips disposed in a common plane and the intermediate strip disposed in a plane perpendicular to said common plae whereby said link may be flexed in each plane.

3. In a citrus fruit sectionizing machine having apparatus for concurrently reciprocating a plurality of sectionizing blades; the combination of a plurality of guiding units one for each blade, said guiding units each comprising means for holding a sectionizing blade, means adapted to swing the blade about a vertical axis, and means adapted to swing the blade about a horizontal axis; a head plate; a resilient metal member fastened to said head plate and to said reciprocating apparatus for reciprocating the head plate in a vertical direction; and flaxible means connected between said head plate and each of said guiding units, each of said flexible means comprising at least two strips of metal fastened together in end to end relationship one of said strips being oriented at approximately 90° to the other.

References Cited in the file of this patent
UNITED STATES PATENTS

| | | |
|---|---|---|
| 436,581 | Huntley | Sept. 16, 1890 |
| 1,394,784 | Pearson | Oct. 25, 1921 |
| 2,097,170 | Wilson | Oct. 26, 1937 |
| 2,333,041 | Poulter | Oct. 26, 1943 |
| 2,398,455 | Unger | Apr. 16, 1946 |